United States Patent [19]

Furuya et al.

[11] Patent Number: 4,989,475
[45] Date of Patent: Feb. 5, 1991

[54] GOVERNOR ARRANGEMENT IN AUTOMATIC TRANSMISSION

[75] Inventors: Osamu Furuya, Isehara; Kazuhiko Sugano, Yokohama, both of Japan

[73] Assignee: Nissan Motor Co., Ltd., Yokohama, Japan

[21] Appl. No.: 287,296

[22] Filed: Dec. 21, 1988

[30] Foreign Application Priority Data

Dec. 24, 1987 [JP] Japan .................. 62-327887

[51] Int. Cl.⁵ .............................. F16H 57/02
[52] U.S. Cl. .................................. 74/606 R
[58] Field of Search ............... 74/606 R, 606 A, 608, 74/609, 359

[56] References Cited

U.S. PATENT DOCUMENTS

| 4,427,088 | 1/1984 | Tsuboi ........................ 74/606 R |
| 4,433,593 | 2/1984 | Ikemoto et al. ............... 74/606 R |
| 4,446,755 | 5/1984 | Takahashi ..................... 74/606 R |

FOREIGN PATENT DOCUMENTS

| 2256150 | 5/1974 | Fed. Rep. of Germany .... 74/606 R |
| 0157852 | 9/1982 | Japan ........................ 74/606 R |
| 0203252 | 11/1983 | Japan ........................ 74/606 R |
| 0256062 | 11/1986 | Japan ........................ 74/606 R |

OTHER PUBLICATIONS

Service Manual for Toyota A140 Automatic Transmission, FIGS. 3–5, published May 1985 by Toyota Motor Co., Ltd.

Primary Examiner—Vinh T. Luong
Attorney, Agent, or Firm—Foley & Lardner, Schwartz, Jeffery, Schwaab, Mack, Blumenthal & Evans

[57] ABSTRACT

In an automatic transmission, a governor shaft is arranged so that a center axis of a governor shaft is interposed between a center axis of an idler shaft and a center axis of a final drive gear. In one embodiment, the center axis of the governor shaft is further disposed between a center axis of an output gear and the center axis of the final drive gear, and a governor valve is disposed above a drive shaft joint. In another embodiment, the governor valve is disposed below the drive shaft joint.

7 Claims, 3 Drawing Sheets

GOVERNOR ARRANGEMENT IN AUTOMATIC TRANSMISSION

BACKGROUND OF THE INVENTION

1. Field of the Invention

The present invention relates in general to automatic transmissions and more particularly to a governor arrangement in an automatic transmission.

2. Description of the Prior Art

An example of a prior art governor arrangement in an automatic transmission is disclosed in "Service Manual for Toyota A140 Automatic Transmission", published in May, 1985 by Toyota Motor Co., Ltd. and also shown in FIGS. 3 to 5.

Referring to FIGS. 3 to 5, the automatic transmission is of the kind for use in a transversely mounted front-engine front-drive vehicle and there is disposed within a transmission case 01 a power train for transmission of power from an engine 02. The power train includes a main power train 03, output gear 04, idler gear 05, final drive gear 06 and differential gear 07 and is constructed so that the output gear center axis Oo, idler gear center axis Oa and final drive gear center axis Of are parallel to each other. A governor 08 is adapted to receive rotary motion from an idler shaft 09 provided with the idler gear 05 and arranged so that the governor shaft O8a intersects the idler shaft 09 at right angles when viewed in a plane of projection parallel to the idler gear center axis Oa and the governer shaft center axis Og.

The reason why the governor 08 is adapted to receive rotary motion from the idler shaft 9 is that if adapted to receive rotary motion from the output gear 04 the axial length of the transmission is increased and if adapted to receive rotary motion from a differential gear section its rotary motion is affected by a final gear ratio, both therefore being undesirable. Further, it is because there is a sufficient space for installation of the governor 08 around the idler shaft 09.

In FIGS. 3 to 5, indicated by 010 is a converter housing, by 011 a differential receiving transmission case portion, by 012 a drive shaft joint, by 013 a drive shaft, by 014 a manual shaft, by 015 a control valve, by 016 an oil strainer and by 017 an oil pan.

The prior art arrangement has the following problems.

(1) The governor shaft O8a is interposed between the output gear center axis Oo and the idler gear center axis Oa. Due to this, the length indicated by "A" in FIG. 3 (the vertical distance between the output gear center axis Oo and the idler gear center axis Oa) and the length indicated by "B" in FIG. 3 (the vertical distance between the output gear center axis Oo and the lowest part of the automatic transmission) are large.

Accordingly, if the layout of the automatic transmission is made by giving preference to the ground clearance "H", the engine hood must be arranged in a high position, thus causing a design restriction. On the other hand, if the layout of the automatic transmission is made by giving preference to the position of the engine hood, the ground clearance "H" becomes small, thus causing a problem that the transmission is likely to contact the ground.

(2) The drive shaft joint 012 and the drive shaft 013 stand as obstacles in the path or way through which the governor 08 is to be drawn upon removal.

Due to this, inspection and exchange of the governor 08 cannot be carried out with the drive shaft joint 012 and the drive shaft 013 being installed in place but it is necessary to remove the drive shaft joint 012 and the drive shaft 013 prior to removal of the governer 08 for inspection or exchange.

Accordingly, it is impossible to inspect or exchange the governer 08 when the drive shaft, etc. are installed in place.

SUMMARY OF THE INVENTION

In accordance with the present invention, there is provided an automatic transmission which comprises a transmission case and a power train disposed within the transmission case and including a main power train, output gear, idler gear, final drive gear and differential gear. The output gear, idler gear and final drive gear are arranged so that a center axis of the output gear, center axis of the idler gear and center axis of the final drive gear are parallel to each other.

The transmission further comprises an idler shaft provided with the idler gear and a governor disposed within the transmission case and operatively connected to the idler shaft for receiving rotary motion therefrom.

The governor has a governor shaft and is arranged so that a center axis of the governor shaft as disposed between the center axes of the idler gear and the final drive gear so as to cross same.

The above arrangement is effective for solving the above noted problems inherent in the prior art arrangement.

It is accordingly an object of the present invention to provide an improved automatic transmission which can reduce the overall height thereof.

It is another object of the present invention to provide an improved automatic transmission of the above described character which makes it possible to perform inspection and exchange of a governor with ease, i.e., without requiring removal of adjacent parts as a drive shaft.

It is a further object of the present invention to provide an improved automatic transmission of the above described character which makes it possible to arrange an engine hood of a vehicle at a low level above the ground, thus increasing the design and layout freedom.

DESCRIPTION OF THE PREFERRED EMBODIMENTS

Figure 1:
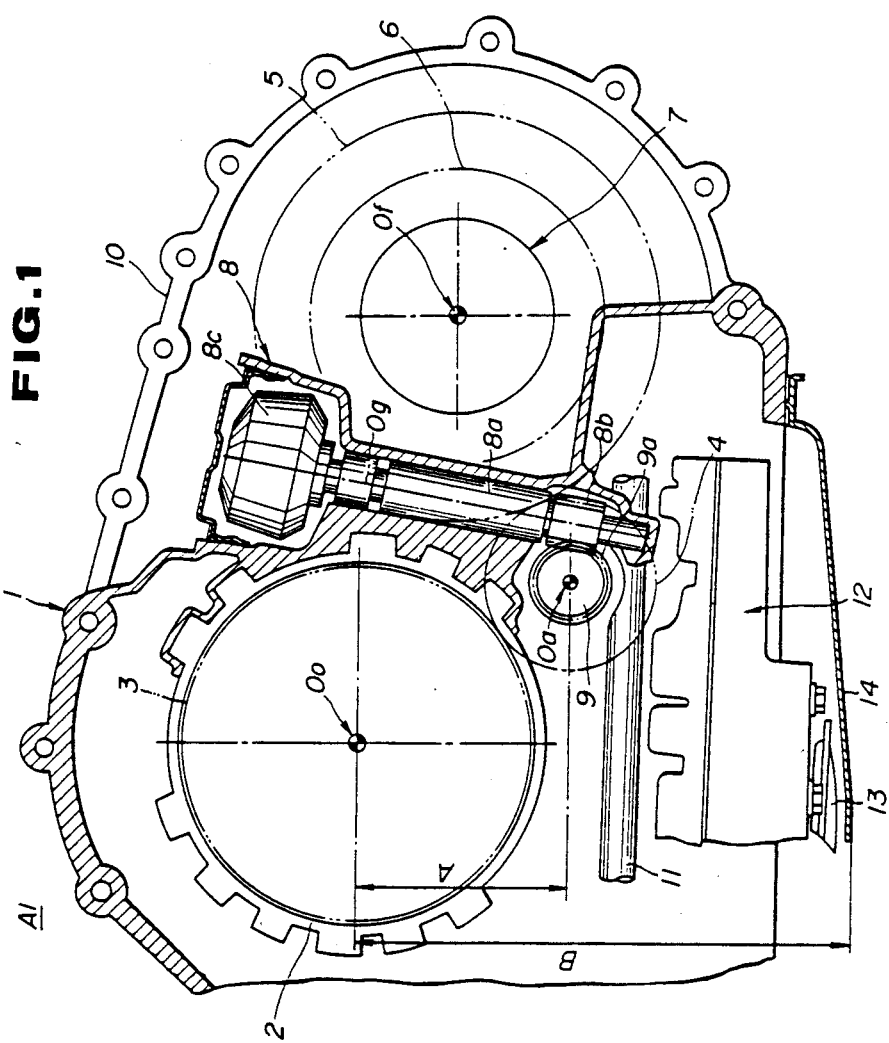
FIG. 1 is a fragmentary sectional view of an automatic transmission incorporating a governor arrangement according to an embodiment of the present invention.

Referring to FIG. 1, an automatic transmission A1 incorporating a governor arrangement according to an embodiment of the present invention includes a transmission case 1 within which a power train for transmission of power from an engine (not shown) is disposed. The power train includes a main power train 2, output gear 3, idler gear 4, final drive gear 5 and differential gear 6. The output gear 3, idler gear 4 and final drive gear 5 are meshed with each other and have center axes Oo, Oa and Of which are parallel to each other.

Though not shown, the main power train 2 is constituted by concentric input and output shafts and a planetary gear train interposed between the input and output shafts. The output shaft of the main power train 2 is provided with the output gear 3 for transmitting rotary motion to the idler gear 4.

The differential gear 6 is disposed within a differential case (not shown) provided with the final gear 5 and has side gears (not shown) each of which is connected to a drive shaft (not shown) through a drive shaft joint 7.

A governor 8 is operative to create a governor pressure proportional to vehicle speed and includes a governor shaft 8a, governor gear 8b provided to the governor shaft 8a at a location adjacent one end thereof and governor valve 8c provided to the other and of the governor shaft 8a. The governor gear 8b is meshed with a governor drive gear 9a provided to the idler shaft 9 so that the governor valve 8c receives rotary motion from the idler shaft 9.

The governor shaft 8a is arranged so that the governor shaft 8a intersects the idler shaft 9 at right angles when viewed in a plane of projection parallel to the idler gear center axis Oa and the governor shaft center axis Og, that the governor shaft center axis Og is disposed between the idler gear center axis Oa and the final drive gear center axis Of and between the output gear center axis Oo and the final drive gear center axis Of, and is extended to cross the same when viewed in a plane of projection parallel to the idler gear center axis Oa and the governor shaft center axis Og, and that the governor valve 8c is located above the drive shaft joint 7.

The automatic transmission A1 is further provided with a differential case 10, manual shaft 11, control valve 12, oil strainer 13 and oil pan 14.

The operation will be described hereinafter.

(I) Upon installation of automatic transmission on vehicle

With the foregoing arrangement, the governor shaft 8a can be installed on the automatic transmission A1 without being interposed between the output gear center axis Oo and the idler gear center axis Oa. As a result, the length A (the vertical distance between the output gear center axis Oo and the idler gear center axis Oa) and the length B (the vertical distance between the output gear center axis Oo and the lowest part of the automatic transmission A1) can be smaller as compared with the prior art arrangement by the amount corresponding to the space necessary for disposition of the governor shaft 8a, thus making it possible to reduce the overall height of the automatic transmission A1 of itself.

The engine hood can therefore be lowered without reducing the ground clearance of the automatic transmission A1, thereby increasing the design and layout freedom.

(II) Upon inspection and replacement of governor

When the governor 8 is installed in place, the drive shaft joint 7 and the drive shaft do not stand as obstacles in the way through which the governor shaft 8a is to be drawn upon removal as seen from FIG. 1, thus making it possible to remove the governor with the drive shaft joint 7 and the drive shaft being installed in place and without requiring them to be removed prior to removal of the governor 8.

By this, it becomes possible to perform inspection or removal of the governor 8 with the drive shaft joint 7 and the drive shaft being installed in place and without requiring the worker to get under the vehicle.

Figure 2:
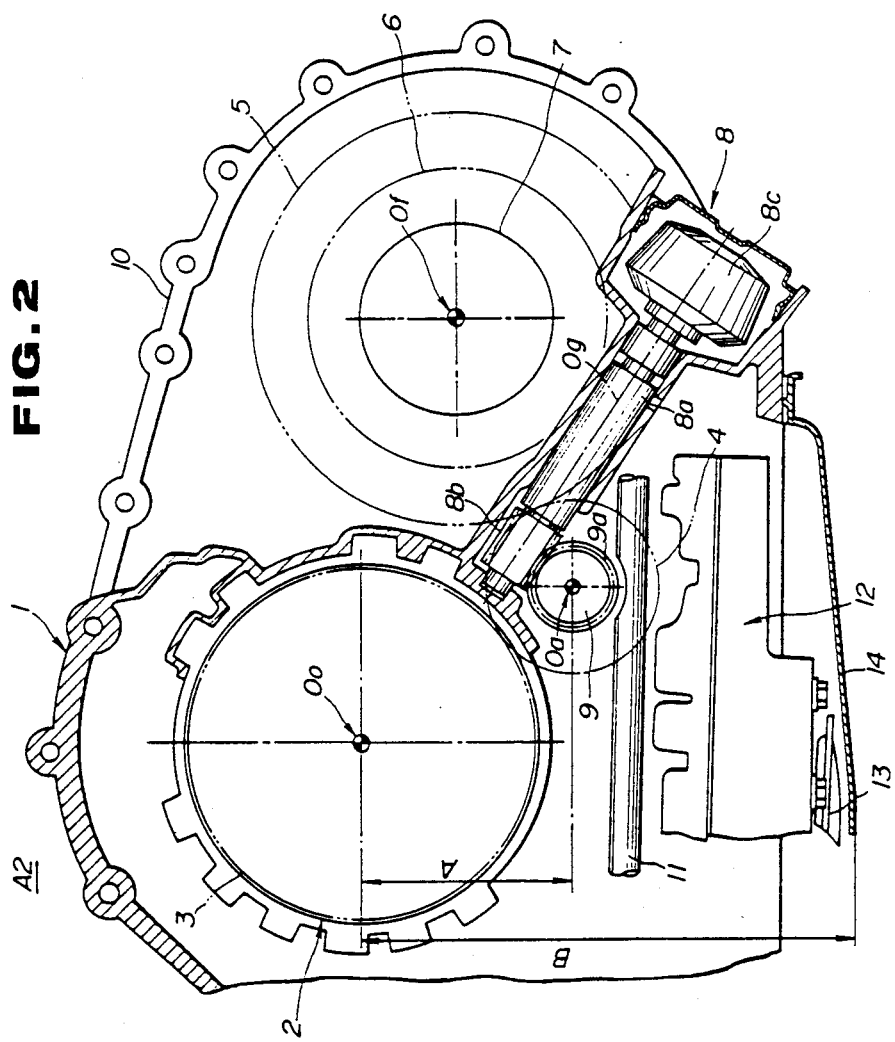
FIG. 2 is a view similar to FIG. 1 but showing another embodiment of the present invention.
Figure 4:
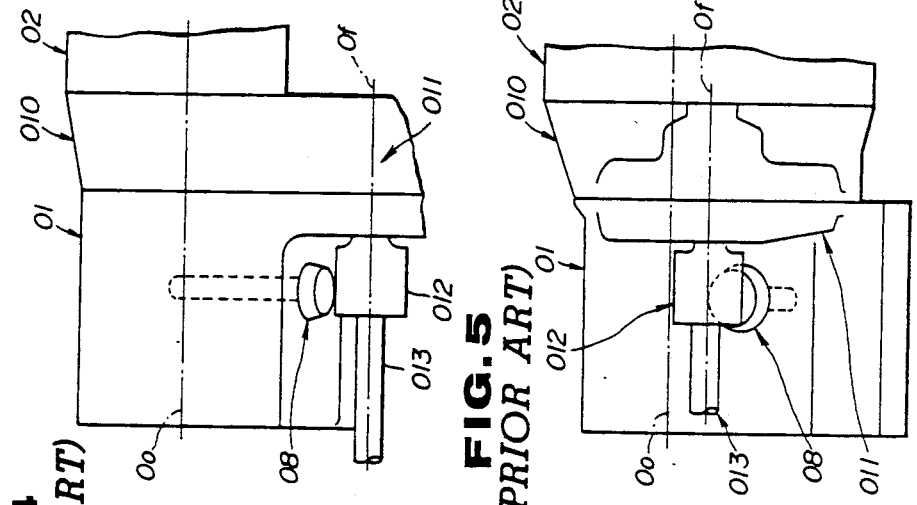
FIG. 4 is a schematic plan view of the prior art automatic transmission of FIG. 3.
Figure 5:
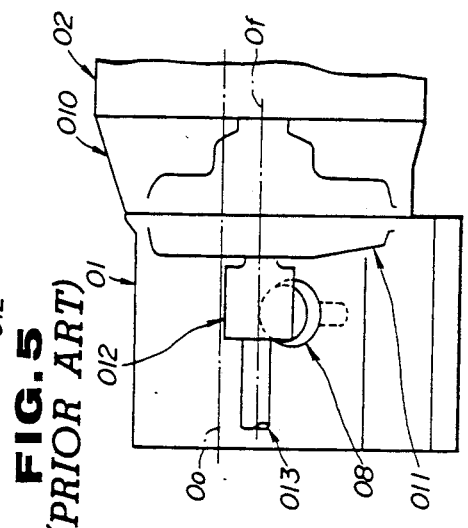
FIG. 5 is a rear elevational view of the prior art automatic transmission of FIG. 3.
Figure 3:
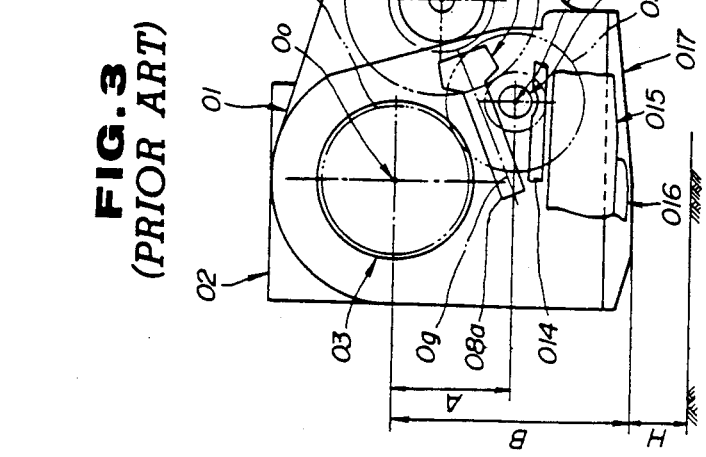
FIG. 3 schematic side elevational view of a prior art auto transmission.

FIG. 2 shows another embodiment in which the governor 8 is arranged so that the governor shaft center axis Og is disposed between the idler gear center axis Oa and the final drive gear center axis Of so as to cross the same when viewed in a plane of projection parallel to the idler gear center axis Oa and the governor shaft center axis Og and that the governor valve 8c is located below the drive shaft point 7. Except for the above, this embodiment is substantially similar to the previous embodiment of FIG. 1 and can produce substantially the same effect.

While the automatic transmission has been described and shown as being of the type having a main power train constituted by a planatary gear train, the present invention is not limited to this type of automatic transmission. For example, the present invention can be applied to an automatic transmission having two-parallel-axis type gear train and to a non-stage automatic transmission having variable diameter pulleys.

What is claimed is:

1. An automatic transmission comprising:
    a transmission case;
    a power train disposed within said transmission case and including a main power train, output gear, idler gear, final drive gear and differential gear;
    said output gear, idler gear and final drive gear all having center axes arranged so that the center axis of said output gear, center axis of said idler gear and center axis of said final drive gear are parallel to each other;
    an idler shaft provided with said idler gear; and
    a governor disposed within said transmission case and operatively connected to said idler shaft for receiving rotary motion therefrom;
    said governor having a governor shaft and being arranged so that a center axis of said governor shaft is offset from and disposed between said center axes of said idler gear and said final drive gear.

2. The automatic transmission according to claim 1 wherein said center axis of said governor shaft is further disposed between said center axes of said output gear and said final drive gear.

3. The automatic transmission according to claim 2, further comprising a drive shaft joint operatively connected to said differential gear, said governor further having a governor valve which is disposed above said drive shaft joint.

4. The automatic transmission according to claim 1, further comprising a drive shaft joint operatively connected to said differential gear, said governor further having a governor valve which is disposed below said drive shaft joint.

5. An automatic transmission as claimed in claim 1, wherein said governor shaft is arranged so that said governor shaft extends so as to cross said idler shaft when viewed in a plane of projection parallel to the center axes of said idler shaft and said governor shaft.

6. An automatic transmission comprising:
    a transmission case;
    a power train disposed within said casing and including a main power train, output gear, idler gear, final drive gear and differential gear;
    said output gear, idler gear and final drive gear being arranged so that a center axis of said output gear, center axis of said idler gear and center axis of said final drive gear are parallel to each other;

an idler shaft provided with said idler gear;

a drive shaft joint operatively connected to said differential gear; and a governor disposed within said transmission case and operatively connected to said idler shaft for receiving rotary motion therefrom;

said governor having a governor shaft and a governor valve at one end of said governor shaft and being arranged in such a way that said governor shaft axially extends so as to intersect said idler shaft at right angles when viewed in a plane of projection located between and parallel to the center axes of said idler shaft and said governor shaft, said center axis of said governor shaft being offset from and disposed between said center axes of said idler gear and said final drive gear and above said drive shaft joint.

7. An automatic transmission as claimed in claim 6, wherein said center axis of said governor shaft is offset from and disposed between said center axes of said idler gear and said final drive gear when viewed in said plane of projection, and said governor valve is disposed below said drive shaft joint.

* * * * *